US008502698B2

(12) United States Patent
Chen et al.

(10) Patent No.: US 8,502,698 B2
(45) Date of Patent: Aug. 6, 2013

(54) PARKING LOT MANAGEMENT SYSTEM

(75) Inventors: Chi-Tung Chen, Taichung (TW); Iuon-Chang Lin, Taichung (TW); Cheng-Chi Lee, Taoyuan County (TW); Shung-Kung Wu, Changhua County (TW); Hsing-Chung Chen, Taichung (TW); Shou-Wei Wu, Taichung (TW)

(73) Assignee: National Chin-Yi University of Technology, Taichung (TW)

(*) Notice: Subject to any disclaimer, the term of this patent is extended or adjusted under 35 U.S.C. 154(b) by 214 days.

(21) Appl. No.: 13/241,148

(22) Filed: Sep. 22, 2011

(65) Prior Publication Data

US 2012/0274482 A1 Nov. 1, 2012

(30) Foreign Application Priority Data

Apr. 26, 2011 (TW) ............................ 100114475 A

(51) Int. Cl.
*B60Q 1/48* (2006.01)

(52) U.S. Cl.
USPC ............................ 340/932.2; 340/5.2; 705/13

(58) Field of Classification Search
USPC .................... 340/932.2, 5.2, 5.1, 5.7; 705/13
See application file for complete search history.

(56) References Cited

U.S. PATENT DOCUMENTS

| | | | | |
|---|---|---|---|---|
| 5,034,739 | A * | 7/1991 | Gruhl | 340/932.2 |
| 6,340,935 | B1 * | 1/2002 | Hall | 340/932.2 |
| 2004/0068433 | A1 * | 4/2004 | Chatterjee et al. | 705/13 |
| 2008/0258935 | A1 * | 10/2008 | Lee | 340/932.2 |
| 2009/0039156 | A1 * | 2/2009 | Brandli et al. | 235/382 |

* cited by examiner

*Primary Examiner* — Eric M Blount
(74) *Attorney, Agent, or Firm* — CKC & Partners Co., Ltd.

(57) ABSTRACT

A parking lot management system comprising a computer host, a handheld device, an entrance sensor, an entrance camera, an entrance stop, an exit sensor, an exit camera, and an exit stop is disclosed. The handheld device interactively transmits data with the entrance sensor and the exit sensor by near-field communication techniques. Each of the entrance camera and the exit camera takes a photo and acquires a license plate number of a vehicle and communicates this information with the computer host. After the computer host confirms and verifies some specific data, the computer host sends instructions to the entrance stop or the exit stop for allowing the vehicle to either enter or exit a parking lot. When exiting the parking lot, the parking fee is paid by the electronic wallet of the handheld device.

9 Claims, 5 Drawing Sheets

PARKING LOT MANAGEMENT SYSTEM

RELATED APPLICATIONS

The application claims priority to Taiwan Application Serial Number 100114475, filed Apr. 26, 2011, which is herein incorporated by reference.

BACKGROUND

1. Field of Invention

The present invention relates to a parking lot management system. More particularly, the present invention relates to a parking lot management system using near-field communication techniques and license plate recognition techniques.

2. Description of Related Art

With increased modernization, it has become very common to use vehicles for daily transportation. Therefore, parking lots are necessary facilities for any city. There are several kinds of parking lots, such as level parking lots, multi-story parking lots, and mechanical parking lots. One or more parking lot attendants commonly manage a pay parking lot. In this case, the parking lot attendants read a car plate and record an entry time, and may even direct the driver to an available parking space. When the vehicle leaves the parking lot, the calculation and payment related to the parking fee is also proceed by the parking lot attendants. The advantages of such a system include high accuracy in the identification to vehicles and high security of the parking lot due to the presence of the parking lot attendants. The disadvantages include high cost, and the difficulties encountered when the parking lot attendants have to manage a large parking lot. Moreover, data recorded by the parking lot attendants may be used to ascertain the business condition of a particular day, and any type of long-term business analysis is not possible.

SUMMARY

Hence, an aspect of the present invention is to provide a parking lot management system. The parking lot management system comprises a computer host, an entrance sensor, an entrance camera, an entrance stop, an exit sensor, an exit camera, and an exit stop. The computer host has a database. The parking lot management system can work with a handheld device. The handheld device is arranged in a vehicle having a license plate number and comprises a near-field communication interface, a display panel and an electronic wallet.

The entrance sensor is arranged near an entrance of the parking lot and communicates with the computer host. If the entrance sensor senses a serial number data from the near-field communication interface of the handheld device, the entrance sensor is configured for sharing the serial number data with the computer host to identify a vehicle status, for recording an entry time data and transmitting it to the computer host, and for communicating using near field communication techniques a parking space data generated based on the database with the handheld device to thereby cause the handheld device to display the parking space data on the display panel. The entrance camera is arranged near the entrance of the parking lot and communicates with the computer host. If the vehicle stops by the entrance, the entrance camera is configured for capturing a first photo data of the vehicle, for acquiring a first license plate number data from the license plate number of the vehicle, and for transmitting the first photo data and the first license plate number data to the computer host. The entrance stop is arranged near the entrance of the parking lot and is controlled by the computer host so as to open after receiving an entrance permission signal.

The exit sensor is arranged near an exit of the parking lot and communicates with the computer host. If the exit sensor senses the serial number data from the near-field communication interface of the handheld device, the exit sensor is configured for transmitting the serial number data to the computer host for a first verification so as to confirm the vehicle status, for recording an exit time data and transmitting it to the computer host, and for communicating with the handheld device using near field communication techniques to pay a parking fee by the electronic wallet.

The exit camera is arranged near the exit of the parking lot and communicates with the computer host. If the vehicle stops by the exit, the exit camera is configured for capturing a second photo data of the vehicle, for acquiring a second license plate number data from the license plate number of the vehicle, and for transmitting the second photo data and the second license plate number data to the computer host for a second verification of comparing the first photo data with the second photo data and comparing the first license plate number data with the second license plate number data.

The exit stop is arranged near the exit of the parking lot and is controlled by the computer host so as to open after receiving an exit permission signal generated after the second verification completed.

In other embodiments, the computer host searches in the database after receiving the serial number data from the entrance sensor. If the search fails to find the serial number data in the database, the vehicle status is set to access permission granted and the computer host stores the serial number data, the first photo and the first license plate number data in the database.

In other embodiments, the parking space data comprises a parking space number, a location of the parking space, and a route to the parking space.

In other embodiments, the parking lot management system further comprises a stolen vehicle database and an alarm. The computer host checks the first photo data and the first license plate number data of the vehicle with the stolen vehicle database and activates the alarm if there is a match of either or both the first photo data and the first license plate number data of the vehicle in the stolen vehicle database.

In other embodiments, the computer host starts searching in the database after receiving the serial number data from the exit sensor. If the serial number data is found in the database, the first verification is completed and the vehicle status is set to departure access granted.

In other embodiments, the computer host calculates the parking fee based on a time duration between the entry time data and the exit time data and transmits the parking fee to the exit sensor.

In other embodiments, the parking lot management system further comprises an alarm, wherein the computer host activates the alarm if an error occurs in the first verification or the second verification.

In other embodiments, the parking lot management system further comprises a parking space sensor arranged in a parking space corresponding to the parking space data and which transmits shop information to the handheld device using near-field communication techniques.

In other embodiments, the shop information comprises at least one of sales information, shop location information and parking fee information.

Thus, the above embodiments of the parking lot management system can improve the efficiency and security of the parking lot and also provide convenient financial management to the customers.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
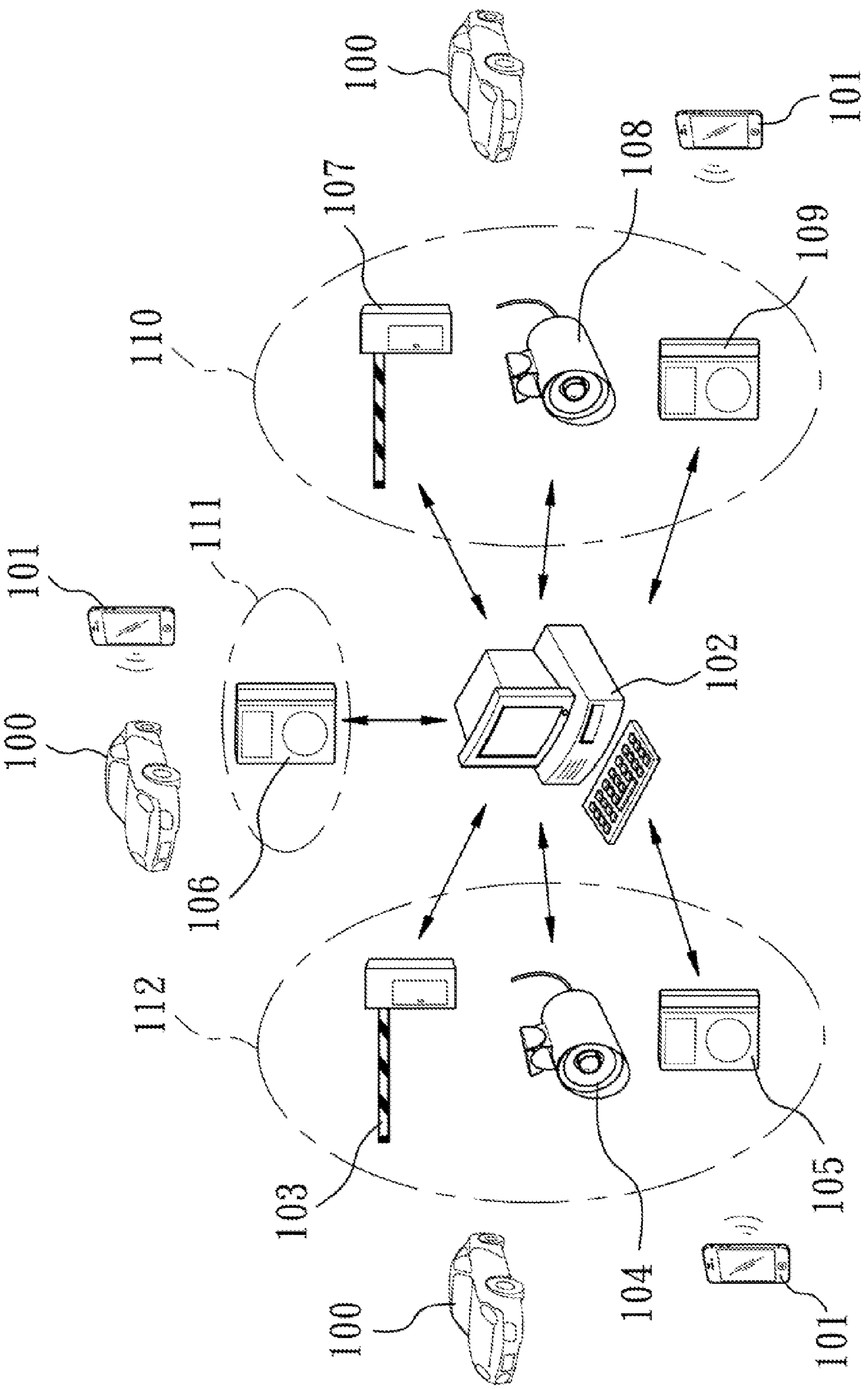
FIG. 1A is a schematic diagram showing the structure of a parking lot management system in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
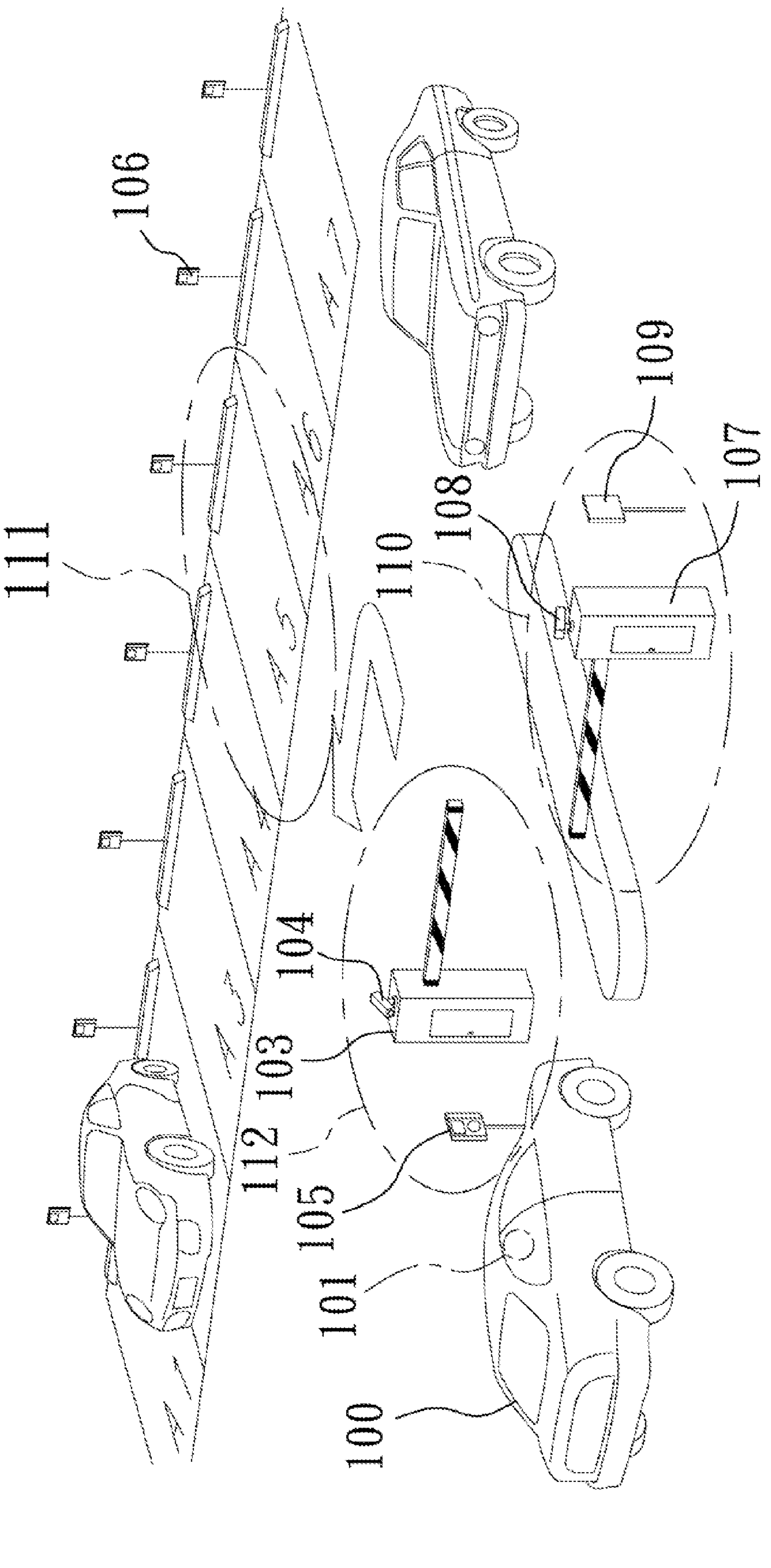
FIG. 1B is a schematic diagram showing the arrangement of the parking lot management system as shown in FIG. 1A in a parking lot.

FIGS. 1A-1B are schematic diagrams showing a parking lot management system in this present application. The parking lot management system comprises a computer host 102 having a database, a car 100 with a license plate number, and a mobile phone 101. An entrance sensor 105, an entrance camera 104 and an entrance stop 103 are set up at the entrance 112 of a parking lot. An exit sensor 109, an exit camera 108 and an exit stop 107 are set up at the exit 110 of the parking lot. A parking space sensor 106 is set up at a parking space 111 of the parking lot. The entrance sensor 105, the exit sensor 109, and the parking space sensor 106 can share data with the mobile phone 101 by near-field communication (NFC).

The mobile phone 101 is held by a passenger or driver in the car 100 and embedded with a near-field communication (NFC) interface, a display panel and an electronic wallet. The database of the computer host 102 comprises a plurality of car data, such as serial number data, entry time data, exit time data, first license plate number data, second license plate number data, first photo data, second photo data, parking space data and parking fee data.

Each of the entrance camera 104 and the exit camera 108 works with an identification system so as to identify relevant information of the car with reference to the first photo data and the second photo data, such as model, the license plate number, and color.

As is evident from FIG. 1B, the entrance 112, the exit 110 and the parking space 111 may be arranged in various configurations to thereby be suitable for different kinds of parking lots. Hence, the parking lot management system shown in FIG. 1A can have widespread applications.

Figure 2:
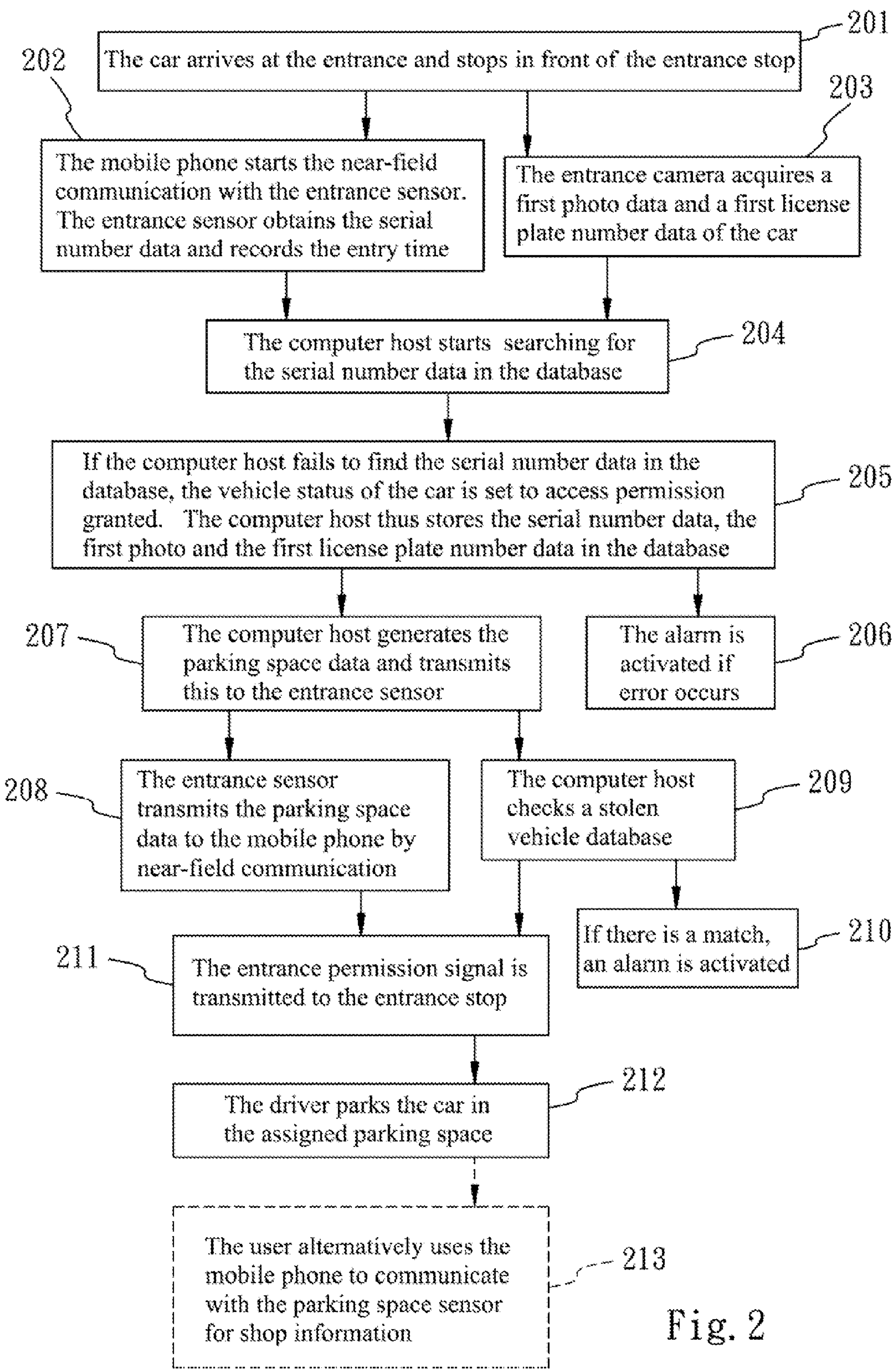
FIG. 2 is a flow chart illustrating processes associated with a car entering a parking lot using the parking lot management system as shown in FIG. 1A.

FIG. 2 is a flow chart illustrating processes associated with a car entering the parking lot using the parking lot management system as shown in FIG. 1A. When the car arrives at the entrance 112, the car stops in front of the entrance stop 103 (Step 201). If the entrance sensor 105 set up near the entrance 112 of the parking lot senses, using near-field communication techniques, a serial number data from the NFC interface of the mobile phone 101, the entrance sensor 105 shares the serial number data with the computer host 102 to identify a vehicle status, for recording an entry time data and transmitting it to the computer host 102. Meanwhile, the entrance camera 104 set up near the entrance 112 of the parking lot captures a first photo data of the car, and acquires a first license plate number data from the license plate number of the car. The first photo data and the first license plate number data are transmitted to the computer host 102 (Steps 202-203).

The entrance sensor 105 transmits the serial number data to the computer host 102. The computer host 102 starts searching in the database after receiving the serial number data from the entrance sensor 105 (Step 204). If the computer host 102 fails to find the serial number data in the database, the vehicle status of the car 100 is set to access permission granted. The computer host 102 thus stores the serial number data, the first photo and the first license plate number data in the database (Step 205). If there is any error, for example, the serial number data has been stored in the database or the serial number data is linked with a stolen car, the computer host 102 activates an alarm (Step 206).

Next, the computer host 102 allocates an available parking space to the car 100 according to the content of the database, such as non-occupied parking spaces of the parking lot at that time, and generates parking space data of the available parking space and transmits the same to the mobile phone 101 for display on the display panel of the mobile phone 101 (Steps 207-208). The parking space data can be a parking space number, a location, and a route to the available parking space. For example, if the computer host 102 allocates a non-occupied parking space A1 to be the available parking space for the car 100, the parking space data that is generated and shown on the mobile phone 101 may include the parking space number of A1 and a map of the parking lot with an indication of the parking space A1 and a route from the entrance to the parking space A1.

In addition, in some embodiments, when the car 100 stops at the entrance 112, the computer host 102 further checks the first photo data and the first license plate number data with a stolen vehicle database obtained from a public website established by the police. When such a check results in a match, the computer host 102 activates an alarm (Steps 209-210).

If the above Steps 201-210 are executed without activation of an alarm in Step 206 or 210, the computer host 102 will send an entrance permission signal to the entrance stop 103, which in response, opens (e.g., a gate is lifted up) to thereby allow the car 100 to move into the parking lot. The driver can thus park the car 100 in the assigned parking space according to the parking space data (Steps 211-212).

After the car 100 is parked in the parking space, the user can use the mobile phone 101 to communicate with the parking space sensor 106 set up at the parking space 111 for obtaining shop information, such as daily sales information, information related to shop locations around the parking lot, parking fee information, etc. (Step 213). Communication at this time may be conducted using near-field communication techniques. The parking space sensor 106 can thus prevent arbitrary parking and route blocking by the car 100 being parked in the assigned parking space. The parking space sensor 106 may even help to ensure proper use of handicapped parking spaces.

Therefore, the car driver can easily access parking spaces in the parking lot and quickly know the route and location of the available parking spaces without having to visually search for parking spaces.

Figure 3:
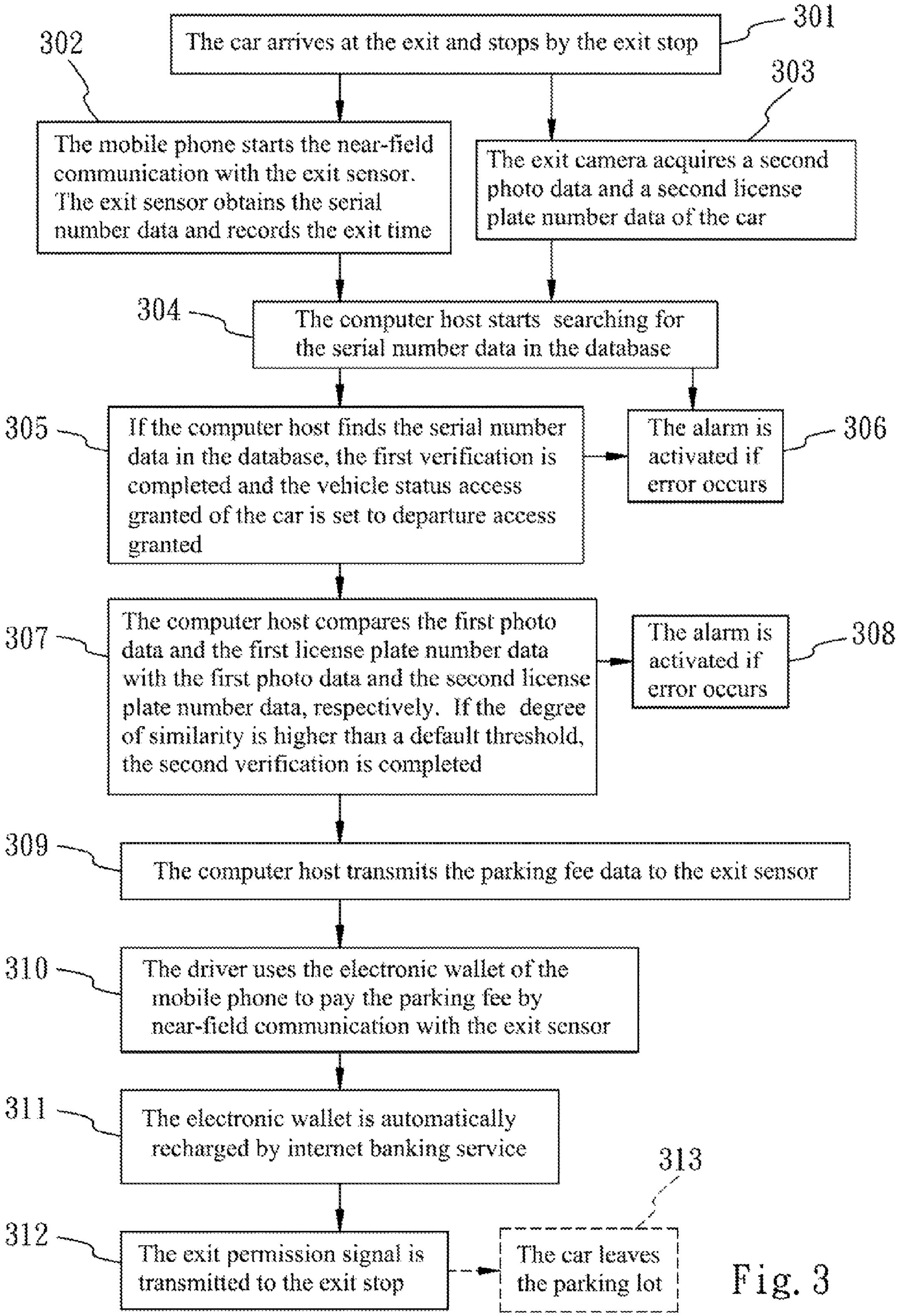
FIG. 3 is a flow chart illustrating processes associated with a car departing from the parking lot using the parking lot management system as shown in FIG. 1A.

FIG. 3 is a flow chart illustrating processes associated with a car departing from the parking lot using the parking lot management system as shown in FIG. 1A. When leaving the parking lot, the driver can directly drive the car 100 to the exit stop 107 at the exit 110 (Step 301). The user in the car 100 uses the mobile phone 101 to communicate with the exit sensor 109 set up at the exit 110 so that the computer host 102 in response proceeds with a first verification, which involves recognizing the vehicle status of the car 100 according to the serial number data. Communication at this time may be conducted using near-field communication techniques. The exit sensor 109 records an exit time data and transmits the same to the computer host 102.

Further, the exit camera 108 at the exit 110 captures a second photo data of the car 100 and acquires a second license plate number data from the license plate number of the car 100. Next, the exit camera 108 transmits the second photo data and the second license plate number data to the computer host 102 for a second verification (Steps 302-307).

Specifically, during the first verification, after the computer host 102 receives the serial number data from the exit sensor 102, the computer host 102 starts searching for the serial number data in the database. If it is determined from the search that the serial number data has been stored in the database, the first verification is completed and the vehicle status of the car 100 is set to departure access granted. At the same time, if any error occurs during the first verification, the computer host 102 activates the alarm immediately (Steps 305-306).

During the second verification, after receiving the second photo data and the second license plate number data, the computer host 102 compares the first photo data and the first license plate number data with the first photo data and the second license plate number data, respectively. If the comparison result (degree of similarity) is higher than a default threshold, the second verification is completed. Next, the computer host 102 generates an exit permission signal and sends the exit permission signal to the exit stop 107. In response, the exit stop 107 opens (e.g., a gate is lifted up) to thereby allow the car 100 to leave the parking lot. At the same time, if any error occurs during the second verification, the computer host 102 activates the alarm immediately to thereby enhance security (Steps 307-308).

As a result, if any error occurs during the first verification or the second verification, the computer host 102 activates the alarm immediately. On the other hand, if the first verification and the second verification are completed without any error occurring, the computer host 102 calculates the parking fee based on a time duration between the entry time data and the exit time data and transmits the parking fee to the exit sensor 109. The driver can use an electronic wallet of the mobile phone 101 to pay the parking fee. The electronic wallet can be recharged using an internet banking service. After all verification is complete, the computer host 102 sends an exit permission signal to the exit stop 107, and in response, the exit stop 107 opens (e.g., a gate thereof lifts up) to allow the car 100 to leave the parking lot (Steps 309-313).

Figure 4:
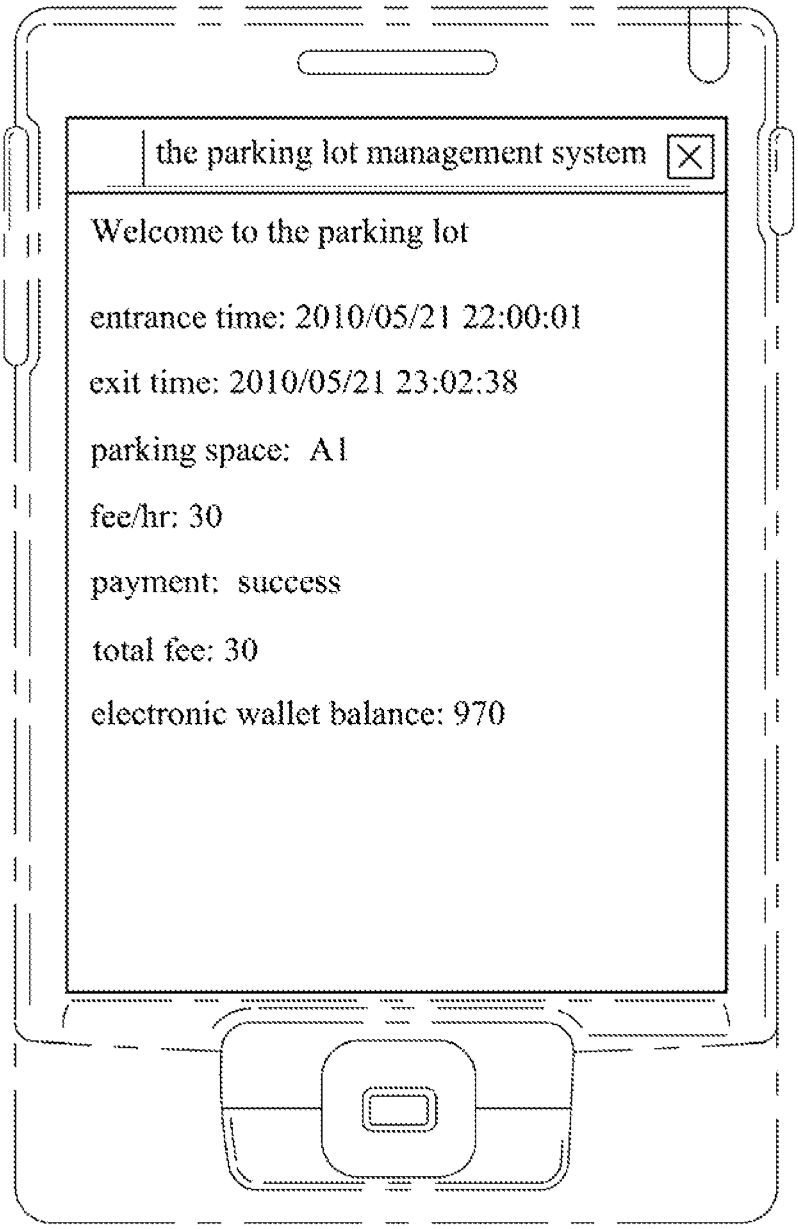
FIG. 4 is a diagram showing an image of an NFC mobile phone using the parking lot management system as shown in FIG. 1A.

FIG. 4 depicts a diagram showing an image of an NFC mobile phone using the parking lot management system as shown in FIG. 1A. After the above-mentioned operations, the mobile phone 101 can display information, such as the serial number data, the entry time data, the exit time data, the parking space number, the parking fee and the electronic wallet balance, on the display panel as shown in FIG. 4.

As is evident from the description provided above, for drivers of vehicles using the parking lot management system disclosed in this present application, it is easy to enter the parking lot by communicating using the NFC chip embedded in the mobile phone with the NFC sensors set up in the parking lot. Such communication only takes a few seconds. The driver thus can know the number, location, and even route to an available parking space right away. When departing, the driver can also use the NFC chip of the mobile phone to communicate with the other NFC sensors set up in the parking lot so as to pay the parking fee and leave the parking lot easily and quickly. As to security provided by the parking lot management system, the cameras at the entrance and exit of the parking lot, which capture images of the vehicles entering and exiting the parking lot and are capable of identifying license plates, can provide a triple-check mechanism. In particular, the first check is that related to determining if the entering car is a stolen car at the entrance, the second check, is that related to determining if the car is parked in the right parking space, and the third check is that related to executing the second verification at the exit.

Moreover, the parking lot management system disclosed in this present application can further statistically analyze the vehicle data to help establish a better management flow.

For at least all these reasons, it is obvious that the parking lot management system disclosed in this present application provides a time-saving, convenient, and safe way to manage a parking lot.

Although the present invention has been described in considerable detail with reference to certain embodiments thereof, other embodiments are possible.

Therefore, the spirit and scope of the appended claims should not be limited to the description of the embodiments contained herein.

What is claimed is:

1. A parking lot management system, comprising:

a computer host with a database;

an entrance sensor arranged near an entrance of a parking lot and communicating with the computer host and a handheld device arranged in a vehicle with a license plate number, the handheld device comprising a near-field communication interface, a display panel and an electronic wallet, wherein when the entrance sensor senses serial number data from the near-field communication interface of the handheld device by near-field communication therewith, the entrance sensor is configured to transmit the serial number data to the computer host for identifying a vehicle status of the vehicle, and to record an entry time data and transmit the entry time data to the computer host, and then to transmit a parking space data of an available parking space based on the database by near-field communication to the handheld device to thereby cause the handheld device to display the parking space data on the display panel;

an entrance camera arranged near the entrance of the parking lot and communicating with the computer host, wherein when the vehicle passes by the entrance, the entrance camera is configured to capture a first photo of the vehicle for retrieving first license plate number data from the license plate number of the vehicle, and to transmit the first photo and the first license plate number data to the computer host;

an entrance stop arranged near the entrance of the parking lot and which is configured to open after receiving an entrance permission signal;

an exit sensor arranged near an exit of the parking lot and communicating with the computer host, wherein when the exit sensor senses the serial number data from the near-field communication interface of the handheld device by near-field communication therewith, the exit sensor is configured to transmit the serial number data to the computer host for performing a first verification by confirming the vehicle status, and to record exit time data and transmitting the exit time data to the computer host, and to deduct a parking fee from the electronic wallet of the handheld device handheld device;

an exit camera arranged near the exit of the parking lot and to communicating with the computer host, wherein when the vehicle passes by the exit, the exit camera is configured to capture a second photo of the vehicle, for retrieving second license plate number data from the license plate number of the vehicle, and to transmit the second photo and the second license plate number data to the computer host for performing a second verification by comparing the first photo data with the second photo data and comparing the first license plate number data with the second license plate number data; and an exit stop which is arranged near the exit of the parking lot and is configured to be opened after receiving an exit permission signal generated after the second verification is completed.

2. The parking lot management system of claim 1, wherein the computer host searches in the database after receiving the serial number data from the entrance sensor, and if the search fails to find the serial number data in the database, the vehicle status is set to access permission granted and the computer host stores the serial number data, the first photo and the first license plate number data in the database.

3. The parking lot management system of claim 1, wherein the parking space data comprises a parking space number, a location of the parking space, and a route to the parking space.

4. The parking lot management system of claim 1, further comprising a stolen vehicle database and an alarm, wherein the computer host checks the first photo data and the first license plate number data of the vehicle with the stolen vehicle database and activates the alarm if there is a match of either or both the first photo data and the first license plate number data of the vehicle in the stolen vehicle database.

5. The parking lot management system of claim 1, wherein the computer host starts searching in the database after receiving the serial number data from the exit sensor, and if the serial number data is found in the database, the first verification is completed and the vehicle status is set to departure access granted.

6. The parking lot management system of claim 5, wherein the computer host calculates the parking fee based on a time duration between the entry time data and the exit time data and transmits the parking fee to the exit sensor.

7. The parking lot management system of claim 5, further comprising an alarm, wherein the computer host activates the alarm if an error occurs in the first verification or the second verification.

8. The parking lot management system of claim 1, further comprising a parking space sensor arranged in a parking space corresponding to the parking space data and which transmits shop information to the handheld device using near-field communication techniques.

9. The parking lot management system of claim 8, wherein the shop information comprises at least one of sales information, shop location information and parking fee information.

* * * * *